United States Patent Office 3,344,100
Patented Sept. 26, 1967

3,344,100
EMULSION POLYMERIZATION USING WATER
INSOLUBLE METAL SALTS OF FATTY ACIDS
Frank J. Donat, Cleveland, and Edwin H. Baker, Cuyahoga Falls, Ohio, assignors to The B. F. Goodrich Company, New York, N.Y., a corporation of New York
No Drawing. Filed July 28, 1965, Ser. No. 475,584
The portion of the term of the patent subsequent to Jan. 26, 1982, has been disclaimed and dedicated to the Public
15 Claims. (Cl. 260—23.7)

This invention relates to emulsion type acrylic ester resins and more particularly pertains to spherical, uniform particle size acrylic ester resins and to a process for preparing same in an aqueous emulsion comprising the use of insoluble soaps as the sole emulsifiers. This is a continuation-in-part of our copending application Ser. No. 202,968, filed June 18, 1962, now abandoned.

The chemical literature reveals little information concerning methods for the provision of spherical, uniform particle size acrylic ester resins. However, methods are shown for the provision of spherical, uniform particle size resins other than the acrylic esters. Only two methods of any consequence are shown for these other resins. One method is the seeding process and the other is the emulsifier deficient procedure. Both of these methods require highly critical techniques.

There are many diverse uses for a spherical, uniform particle size acrylic ester resin. For example, some spherical, uniform particle size acrylic ester resins are useful as secondary calibration standards for investigations in electron microscopy, light microscopy, light scattering, sedimentation studies and aerosol studies. Latex paint formulation theories state that there are reasons for believing that a film-forming, uniform particle size acrylic ester latex resin is desirable to minimize the problems of stability and reproducibility of flow properties of latex paints. U.S. Patent 2,553,916 teaches that powders of synthetic resins that are composed of a mixture of two uniform particle size resins with the larger uniform particle size resin having a particle size at least six times the size of the smaller uniform particle size resin require a minimum of plasticizer. U.S. Patent 2,553,916 states that it is advantageous in synthetic resin paste formulations to bring about a paintable or pourable condition with a minimum of liquid plasticizer. A large, uniform particle size acrylic ester latex resin is useful in paper treatment for reducing the depth of resin impregnation.

It will become apparent from the discussion of our invention that our uniform particle size acrylic ester resins have utility in the aforementioned areas.

The use of materials commonly referred to as "insoluble soaps," "heavy metal soaps," "insoluble metal soaps," "polyvalent metal soaps," "driers" and "metallic soaps" as the sole emulsifiers for the emulsion polymerization of acrylic esters or mixtures of acrylic esters with other polymerizable monomers was not known at the time of the present invention. The prior art does not teach or suggest that such soaps would have any utility, per se, in the polymerization reaction. There is no indication in the prior art that such materials would have any value as emulsifiers in an aqueous system particularly in view of their known very limited solubility in water. The "insoluble soaps" embodied herein are not regarded as emulsifiers for water systems. This invention, which is discussed in more detail below, is indeed unexpected in view of the prior art.

It is an object of this invention to provide acrylic ester resins that have spherical, uniform size particles. Another object of this invention is to provide spherical, uniform particle size acrylic ester resins in a single step polymerization. Still another object is the provision of a method for preparing spherical, uniform particle size acrylic ester resins having a predetermined particle size.

The following description and examples will show the accomplishment of the foregoing and other objects.

We have discovered a method for preparing spherical, uniform particle size polyacrylic ester resins which comprises conducting the polymerization of a monomer mixture of from 60 to 100% by weight of at least one acrylic ester and from 0 to 40% by weight of at least one other polymerizable monomer in water at a concentration of greater than 70 weight percent water based on the total weight of water and monomer with agitation in the presence of an insoluble soap as the sole emulsifier. Included among the useful acrylic ester monomers are those having the structure

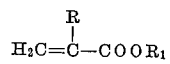

wherein R is a member selected from the group consisting of hydrogen, methyl and halogen and $R_1$ is an alkyl group having from 1 to 18 carbon atoms.

Thus, the acrylic ester resins included herein are homopolymers of an acrylic ester, copolymers and interpolymers of at least 60% by weight of at least one acrylic ester and up to 40% by weight of one or more various other vinyl monomers copolymerizable with acrylic esters.

Included in the group of various other vinyl monomers copolymerizable with the acrylic ester are those monomers containing a grouping selected from the class consisting of

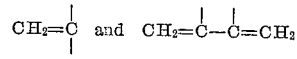

groupings. Such vinyl monomers include vinyl halides such as vinyl chloride, vinyl bromide, vinyl fluoride, vinylidene chloride, vinylidene bromide, vinylidene fluoride, chlorotrifluoro ethylene, trichloroethylene, 1,2-dichloroethylene, and the like; the acrylate esters such as phenyl acrylate, cyclohexyl acrylate, 2-cyanoethyl acrylate, 2-hydroxy-ethyl acrylate and the like; the methacrylate esters such as phenyl methacrylate, cyclohexyl methacrylate, 2-hydroxy ethyl methacrylate, 2-cyanoethyl methacrylate, Cellosolve methacrylate, and the like; the dienes such as 1,3-butadiene, 1,3-butadiene having the 2 position substituted with a member selected from the group consisting of halo atoms and alkyl groups of from 1 to 4 carbon atoms, 1,3-butadiene substituted at the 2 and 3 positions with members selected from the group consisting of halo atoms and alkyl groups of from 1 to 4 carbon atoms. Such substituted 1,3-butadienes include 2,3-dimethyl-1,3-butadiene, 2,3 - dichloro-1,3-butadiene, 2-methyl - 3 - chloro - 1,3 - butadiene and the like; vinyl cyanides such as acrylonitrile, methacrylonitrile, vinylidene cyanide, fumaronitrile, maleonitrile, and the like and others; the maleate esters such as dimethyl maleate, diethyl fumarate, the dipropyl maleates, the dibutyl maleates, the diamyl maleates the dihexyl maleates, dicyclohexyl maleate, diphenyl maleate, and the like; the fumarate esters such as dimethyl fumarate, diethyl fumarate, the dipropyl fumarates, the dibutyl fumarates, the diamyl fumarates, the dihexyl fumarates, dicyclohexyl fumarate, diphenyl fumarate, and the like; the vinyl esters such as vinyl acetate, vinyl propionate, vinyl butyrate, vinyl benzoate, vinyl laurate, isopropenyl acetate, isopropenyl caproate, and the like; the vinyl aldehydes such as acrolein and methacrolein; the vinyl amides such as acrylamide, methacrylamide, N-methyl acrylamide and the like; the vinyl carboxylic acids such as acrylic acid and methacrylic acid; the vinyl pyridines such as 2-vinyl pyridine, 3-vinyl pyridine, 4-vinyl pyridine, 2-methyl-5-vinyl pyridine and the like; the vinyl aromatics such as styrene, alpha-methyl styrene, chlorine substituted styrene, the vinyl toluenes, the vinyl xylenes, vinyl naphthalene, and the like; the monoolefins such as ethylene, propylene, the butylenes, the amylenes, the hexylenes, cyclohexene and the like; the vinyl ethers such as vinyl methyl ether, vinyl ethyl ether, the vinyl propyl ethers, the vinyl butyl ethers, the vinyl amyl ethers, the vinyl hexyl ethers, the vinyl heptyl ethers, the vinyl octyl ethers, vinyl cyclohexyl ether, vinyl phenyl ether, vinyl benzyl ether, and the like; the allyl esters and ethers such as allyl acetate, allyl laurate, allyl benzoate, allyl methyl ether, allyl ether and the like; the vinyl ketones such as vinyl methyl ketone, vinyl ethyl ketone, isopropenyl ketone and the like.

Most preferred are the interpolymers of from 60 to 100% by weight of at least one acrylic ester and from 0 to 40% by weight of at least one other monomer selected from the group consisting of styrene, vinyl pyridine, vinyl acetate,

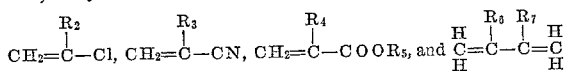

wherein $R_2$ is a member selected from the group consisting of hydrogen and chlorine, $R_3$ and $R_4$ are members selected from the group consisting of hydrogen and an alkyl group having from 1 to 2 carbon atoms, $R_5$ is a member selected from the group consisting of hydrogen and a hydrocarbon group having from 1 to 10 carbon atoms, $R_6$ and $R_7$ are members selected from the group consisting of hydrogen, chlorine and an alkyl group having from 1 to 2 carbon atoms.

The metallic soaps or insoluble soaps useful as the sole emulsifiers in the present invention include the lithium and the polyvalent metal salts of saturated, unsaturated and substituted fatty acids. The polyvalent metal moieties of the soaps embodied herein include in general any metals of groups II, III and IV of the Mendeleef periodic table and more particularly include beryllium, barium, calcium, magnesium, strontium, cadmium, zinc, lead, tin, titanium and aluminum. The fatty acid moieties preferred in the insoluble soaps embodied herein are octanoic, stearic, oleic, linoleic, ricinoleic, palmitic, abietic and the like. Most preferred are the monobasic saturated fatty acids having from 8 to 22 carbon atoms. The insoluble soaps used in this invention are characterized by having a limited solubility in water, more specifically, having a solubility at 20° C. of less than about 0.6 gram-mol per 1000 grams of water and usually less than 0.1 gram-mol per 1000 grams of water. The insoluble soaps embodied herein are most useful in the range of from 0.01 part to 5 parts by weight (per 100 parts of monomer) and preferably from 0.1 to 2.0 parts.

Most preferred in this invention are the insoluble soaps having the formula $(X-COO)_nM$ wherein X is an alkyl group having from 7 to 21 carbon atoms and M is a member selected from the group consisting of lithium, barium, calcium, magnesium, cadmium, zinc, lead, tin and aluminum, and $n$ is a whole number equal to the valence of M.

The vinyl polymer latices of fine particle dispersions produced by the process of this invention generally contain polymer existing as uniform, spherical particles having average diameters of from 0.1 to 10 microns and more preferably from about 0.1 to 3 microns in diameter.

The process of this invention is carried out conveniently in laboratory apparatus for emulsion polymerizations or in large scale polymerization apparatus, preferably in the substantial absence of elemental oxygen and in the presence of a free-radical initiator at a temperature of about 100° C. or below, the temperature being measured at standard pressure. Thus, with superatmospheric pressure the reaction may be carried out at temperatures greater than 100° C. The polymerization reaction can be carried out at atmospheric, sub-atmospheric, or super- atmospheric pressure. Preferably, the polymerization is carried out at a reaction temperature in the range of from about 30° C. to 100° C. In general, the polymerization temperature chosen does not influence the particle size of the product, but as those skilled in the art know, lower temperatures tend to produce higher molecular weight polymers and higher temperatures tend to produce lower molecular weight polymers. It is also known that lower molecular weight resins soften at somewhat lower temperatures than their higher molecular weight analogues.

It is necessary, to obtain a stable latex containing spherical substantially uniform particle size polyacrylic ester resins, that the amount of water used be greater than 70 weight percent based on the total amount of water and monomers. Better results are obtained when the weight percent of water is about 75 to 95 weight percent. When the concentration of water used in a polymerization recipe is less than 70 weight percent the polymerization reaction is difficult to control, the reaction mixture becomes extremely viscous as the concentration of water is decreased, spherical and uniform polymer particles are difficult to obtain and coagulation or agglomeration of the particles occurs. It has been found that when the concentration of water is greater than 70 weight percent, preferably about 75 weight percent, or more, that a stable latex of spherical particles is obtained readily with a minimum of agglomeration of particles. While the concentration of water may be as high as 95%, latices containing this much water normally are not commercially desirable and a more preferable range is from about 75 to about 90 weight percent water based on the total amount of water and monomer.

Acrylic ester polymerizations can be run by batch charging the monomer or metering the monomer. In the batch charging technique all the monomer is added to the polymerization vessel before the polymerization is started. In the metering technique part of the monomer is added to the polymerization vessel before the polymerization is started and the remainder is added to the vessel during the course of the polymerization. The metering technique gives a more stable latex than the batch technique.

The free-radical initiators useful in the present invention include chemicals which decompose to produce free radicals under the foregoing reaction conditions as well as various forms of actinic radiation such as ultraviolet light, X-rays and the various types of nuclear radiation. Preferred as free-radical initiators in the present invention are commonly used polymerization initiators including the peroxides, azo compounds and redox catalysts. Most preferred are the water-soluble initiators such as potassium persulfate, ammonium persulfate, sodium persulfate, hydrogen peroxide, potassium perphosphate and the like as well as the well-known water-soluble redox initiators. The free-radical initiator is most useful in the range of from about 0.01 part to 3 parts per hundred parts of monomer and more preferably from 0.05 part to 0.3 part per hundred of monomer.

Conventional emulsion polymerization buffers may be employed in the present process although they are not necessary for the practice of this invention. Buffers such as ammonia, $NaHCO_3$, $NH_4HCO_3$ and other water-soluble salts generally give slightly more stable latices. The pH of the polymerization mixture does not appear to be critical but it is known that ordinarily a neutral or slightly acidic polymerization mixture is desirable to prevent saponification.

In the novel polymerization process embodied herein the best results are obtained and the most stable latices result when mild but thorough agitation is employed. Stated differently, the most stable latices result from the process embodied herein when good mixing with low shear stirring is employed during the course of the polymerization. The use of high shear stirring is actually a convenient method to coagulate the latex if it is desired to do so either during or after completion of the polymerization reaction. The use of conventional emulsifiers as additional stabilizers after the completion of the polymerization reaction is within the scope of the present invention. Polymers resulting from the present process may be prepared in low or high conversion in a manner known to those skilled in the art. It is essential that the polymerization be carried to the desired degree of conversion in the presence of the insoluble soaps as sole emulsifier, however.

The acrylic ester resins embodied herein may be isolated from their latices by the use of conventional methods of coagulation with such agents as sodium chloride, calcium acetate, sodium carbonate, alcohols, hydrochloric acid, sulfuric acid and the like by procedures well known in the art. The acrylic ester resin latices embodied herein can also be heat coagulated, shear coagulated, freeze coagulated, spray dried or coagulated through water evaporation in the form of films. The coagulated resin is conveniently isolated by filtration, centrifugation or decantation and may be dried in conventional drying equipment.

The insoluble soaps embodied herein may be used per se or they may be generated in situ in the polymerization mixture. The insoluble soap such as barium laurate may be generated in situ, for instance, by adding to the aqueous polymerization mixture substantially stoichiometric quantities of barium hydroxide and lauric acid.

The acrylic ester resins embodied herein are distinguished from other conventional emulsion type acrylic ester resins in that the latter are not spherical, uniform particle size resins. For example, acrylic ester resins prepared with a conventional soluble soap emulsifier will have broad particle size distribution with the average particle size, depending upon the polymerization, ranging from 0.01 micron to about 5 microns.

In the following examples which will serve to illustrate the process of the invention, the amounts of ingredients are expressed in parts by weight unles otherwise indicated.

EXAMPLE I

The polymerization was run in a three-liter three-neck flask. The flask was equipped with the following: thermometer, a mechanical stirrer consisting of a glass stirring rod and blade, water jacketed condenser, dropping funnel, nitrogen sweeping tube and a hemispherical heating mantle. An electric motor with a mechanical speed reducer was used to drive the stirrer. The heating mantle was regulated by a conventional voltage regulator.

Under a nitrogen atmosphere, 1,200 grams of demineralized water was added to the flask. The water was boiled for about ten minutes and then allowed to cool to 60° C. Next, 1.2 grams of finely-divided lithium stearate and 0.4 gram of dissolved potassium persulfate were added to the reaction mixture. 400 grams of purified ethyl methacrylate monomer were added to a dropping funnel. 20 grams of the monomer was released from the dropping funnel into the flask. The remaining monomer was allowed to drip into the reaction flask at a rate of ten drops per minute, during the course of the polymerization. During the first four hours of the polymerization a stirring speed of 240 r.p.m. was maintained. After four hours, the polymerization stirring speed was regulated to 115 r.p.m.

The polymerization was run for 12 hours at 60° C. After polymerization the resulting polyacrylic ester latex was removed from the flask.

A small sample of the latex was diluted with distilled water and the particle size was determined by depositing a sample of the diluted latex on a copper grid, carefully drying and taking an electron photomicrograph of the deposited particles using a Philips (Model E.M. 100B) electron microscope.

The latex particles were uniform spheres having a particle size of 0.35±0.02 micron (3,500±200 A.). Based upon a total solids measurement of the latex and upon the weight of a small amount of coagulated polymer, a conversion of nearly 100 percent was calculated.

EXAMPLE II

A methyl acrylate homopolymer was prepared according to the procedure of Example I from the following recipe:

Methyl acrylate (purified) _____ 100
Potassium persulfate _____ 0.1
Demineralized water _____ 300
Calcium stearate _____ 0.5

The polymerization was taken to a 65 percent conversion. Examination of a diluted sample of the latex under the electron microscope revealed that the latex was composed of spherical uniform particles. The particle size was 0.43±0.04 micron.

A spherical, uniform particle size polymethyl alpha-chloro acrylate resin was obtained when methyl alpha-chloro acrylate was substituted for the methyl acrylate in the above recipe.

EXAMPLE III

A butyl acrylate homopolymer was prepared according to the procedure of Example I from the following recipe:

n-Butyl acrylate (purified) _____ 100
Potassium persulfate _____ 0.2
Demineralized water _____ 300
Calcium palmitate _____ 2.0

The polymerization was run at 50° C. for 26 hours. The polymerization was taken to a 95 percent conversion. The particles of the latex, as determined by an optical microscope, were uniform with a particle size of 0.8 micron.

In determining particle size with an optical microscope, a small sample of the latex is diluted with distilled water, then placed on a microscope slide and covered with a cover glass. A photomicrograph of the particles is taken with an A. O. Spencer phase contrast optical microscope.

EXAMPLE IV

A stearyl methacrylate homopolymer was prepared according to the procedure of Example I. An exception to that procedure was that no monomer was added to the reaction flask initially. All the monomer was dripped into the reaction flask during the course of the polymerization. The following recipe was used:

Stearyl methacrylate (distilled) _____ 100
Potassium persulfate _____ 0.1
Demineralized water _____ 300
Calcium palmitate _____ 1.0

The polymerization was run at 60° C. for 35 hours. The polymerization was taken to a 95 percent conversion. Analysis with the optical microscope showed that the latex was composed of spherical uniform particles. The particle size was 0.75±0.03 micron.

EXAMPLE V

In this series of polymerizations, various types of insoluble soaps were used as the sole emulsifier for ethyl methacrylate monomer. The polymerizations were identical to that described in Example I, except that lithium stearate was replaced by another insoluble soap. The following insoluble soaps were used as emulsifiers for the polymerization of ethyl methacrylate monomer: aluminum myristate, aluminum stearate, calcium laurate, calcium myristate, calcium palmitate, calcium stearate, lead laurate, lead stearate, magnesium laurate, magnesium myristate and magnesium stearate.

The above list of insoluble soaps is not a complete list of all the insoluble soaps that can be used as the sole emulsifier in our invention, but serves only to illustrate the different types of insoluble soaps that are operative in our invention.

Every member of the foregoing series resulted in the formation of a uniform particle size ethyl methacrylate latex.

EXAMPLE VI

A series of ethyl methacrylate homopolymers were prepared according to the procedure of Example I from the following recipe:

Ethyl methacrylate (purified) _____ 100
Potassium persulfate _____ 0.10
Insoluble soap mixture _____ 0.50
Demineralized water _____ 300

The following insoluble soap mixtures were used as emulsifiers for this series of polymerizations:

(a) Calcium laurate _____ 0.25
    Magnesium laurate _____ 0.25
(b) Barium laurate _____ 0.25
    Barium stearate _____ 0.25
(c) Cadmium stearate _____ 0.35
    Calcium laurate _____ 0.15
(d) Lead oleate _____ 0.35
    Lithium laurate _____ 0.15

The polymerization of each member of this series resulted in the production of a spherical uniform particle size latex. This was shown by examining a sample of each of the latices under the optical microscope.

EXAMPLE VII

A copolymer was prepared according to the procedure of Example I from the following recipe:

Methyl methacrylate (purified) _____ 50
Ethyl acrylate (purified) _____ 50
Potassium persulfate _____ 0.10
Calcium laurate _____ 0.50
Demineralized water _____ 300

The polymerization step described in Example I was used. A polymerization temperature of 60° C. was employed. The polymerization was carried to high conversion with the formation of a latex. Optical microscope analysis of the latex revealed that the latex was composed of spherical particles that were uniform in diameter.

EXAMPLE VIII

A copolymer was prepared according to the procedure of Example I from the following recipe:

Methyl methacrylate (purified) _____ 49
Ethyl acrylate (purified) _____ 49
Acrylic acid _____ 2
Potassium persulfate _____ 0.10
Magnesium laurate _____ 0.50
Demineralized water _____ 300

The polymerization step described in Example I was used. A polymerization temperature of 50° C. was employed.

Particle size determination with the optical microscope showed that the resulting latex of this copolymerization was composed of spherical, uniform particles.

EXAMPLE IX

Another copolymer was prepared according to the procedure of Example I from the following recipe:

Methyl methacrylate (purified) _____ 60
Styrene (distilled) _____ 40
Potassium persulfate _____ 0.10
Calcium laurate _____ 0.25
Demineralized water _____ 300

The polymerization step described in Example I was used. A polymerization temperature of 50° C. was employed. Optical microscope analysis revealed that the resulting latex was composed of spherical, uniform particle size particles.

EXAMPLE X

Nine aqueous polymerizations of an acrylic ester using varying concentrations of water were carried out. The equipment and procedure were substantially the same as described in Example XI. The polymerization recipe was as follows:

Parts by weight
Water _____ variable
Methyl methacrylate _____ 100
Potassium persulfate _____ 0.2
Calcium stearate _____ 1.0

The results are summarized in the following table:

| Run No. | Weight percent of water based on total amount of water and monomer | Physical state of polymerized product | Comments |
|---|---|---|---|
| 1 | 26 | Hard, rock-like mass, no latex particles. | Reaction mixture became so viscous that stirrer sheared off. |
| 2 | 36 | Same as Run 1 | Same as Run 1. |
| 3 | 45 | ---do--- | Do. |
| 4 | 55 | ---do--- | After four hours of polymerization the reaction was too viscous to stir and the water and polymer separated. |
| 5 | 65 | ---do--- | Same as Run 4. |
| 6 | 70 | Unsatisfactory, highly agglomerated latex. | Polymer particles of about 0.55 micron in diameter with much coagulation of the particles. |
| 7 | 75 | Satisfactory latex with very little agglomeration. | Polymer particles of uniform size about 0.6 micron diameter. |
| 8 | 80 | ---do--- | Polymer particles of uniform size, about 0.38 micron diameter. |
| 9 | 85 | Excellent latex, no agglomeration. | Polymer particles of uniform size, about 0.5 micron diameter. |

The foregoing results show that at least about 75 weight percent of water, based on the total amount of water and monomer, is required to produce a stable polyacrylic ester resin in latex form of essentially uniform particle size by the aqueous emulsion polymerization of the acrylic ester using an insoluble soap as the sole emulsifier.

EXAMPLE XI

To demonstrate the unexpected results obtained using an insoluble soap such as a fatty acid salt of lithium as the sole emulsifier compared to the use of soluble soaps as sodium or potassium fatty acid salts as the emulsifying agent, three polymerizations of methyl methacrylate in aqueous emulsion were carried out at 60° C. in a three liter glass flask maintained under a nitrogen blanket and equipped with a 100 r.p.m. Teflon stirrer, using the following recipe:

Parts by weight
Water _____ 300
Methyl methacrylate _____ 100
Potassium persulfate (catalyst) _____ 0.2
Emulsifier _____ 1.0

In Run A, the emulsifier was sodium stearate.
In Run B, the emulsifier was potassium stearate.
In Run C, the emulsifier was lithium stearate.

The reactions were conducted for 15 hours. Samples of the product latices were subjected to examination by electron photomicrography. The latex polymer particles had the following characteristics:

*Run A.*—The average particle size was quite small, and the particle size distribution was from about 0.025 to 0.05 micron in diameter, many particles being irregularly shaped.

*Run B.*—The average particle size was small, and the particle size distribution was from 0.05 to 0.1 micron in diameter, many particles being irregularly shaped.

*Run C.*—The average particles were spherical and uniform in size, 0.4 in diameter.

The foregoing results show that in the emulsion polymerization of acrylic esters using alkali metal salts of long chain fatty acids, that the lithium salt (an insoluble soap) is unique when compared to sodium and potassium salts (soluble soaps), in that it unexpectedly provides a latex composed of spherical resin particles of substantially uniform size when used as the sole emulsifier.

We claim:
1. The method for preparing polyacrylic ester resins in latex form which comprises polymerizing monomers containing at least 60% by weight of at least one acrylic ester having the structure

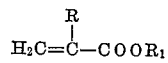

wherein R is a member selected from the group consisting of hydrogen, methyl and halogen and $R_1$ is an alkyl group having from 1 to 18 carbon atoms and up to 40% by weight of one or more other vinyl monomer copolymerizable with said acrylic ester and containing a grouping of

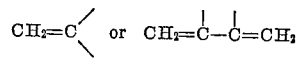

at a temperature below 100° C., with low shear stirring to form resin composed of a family of spherical, uniform size particles having a diameter within the range of 0.01 to 10 microns, in a sufficient amount of water to provide emulsifying conditions for said monomer and resulting resin, the amount of water being at least about 75 percent by weight of the total weight of water and monomers combined in the presence of a free-radical catalyst, and from 0.01 to 5 parts per 100 parts of monomers of an insoluble metallic soap as the sole emulsifying agent which is the salt of a fatty acid having from 8 to 22 carbon atoms and a polyvalent metal.

2. The method of claim 1 wherein the insoluble soap is a salt of barium and a fatty acid having from 8 to 22 carbon atoms.

3. The method of claim 1 wherein the insoluble soap is a salt of aluminum and a fatty acid having from 8 to 22 carbon atoms.

4. The method of claim 1 wherein the insoluble soap is a salt of cadmium and a fatty acid having from 8 to 22 carbon atoms.

5. The method of claim 1 wherein the insoluble soap is a salt of calcium and a fatty acid having from 8 to 22 carbon atoms.

6. The method of claim 1 wherein the insoluble soap is a salt of lead and a fatty acid having from 8 to 22 carbon atoms.

7. The method of claim 1 wherein the insoluble soap is a salt of magnesium and a fatty acid having from 8 to 22 carbon atoms.

8. The method of claim 1 wherein the insoluble soap is a salt of tin and a fatty acid having from 8 to 22 carbon atoms.

9. The method of claim 1 wherein the insoluble soap is a salt of zinc and a fatty acid having from 8 to 22 carbon atoms.

10. The method for preparing a polyacrylic ester resin in latex form, said resin selected from the group consisting of the homopolymers of acrylic esters of the formula

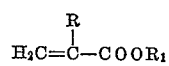

wherein R is a member selected from the group consisting of hydrogen, methyl and halogen and $R_1$ is an alkyl group having from 1 to 18 carbon atoms at a temperature of about 30 to 100° C., said resin composed of a family of spherical, uniform size particles having a diameter within the range of 0.1 to 10 microns, which method comprises polymerizing said acrylic ester said monomer being agitated in admixture with a sufficient amount of water to provide emulsifying conditions for said monomer and resulting resin, the amount of the water being at least about 75 percent by weigh of the total weight of water and monomer combined, in the presence of a free-radical catalyst, the water containing as the sole emulsifying agent, from 0.01 to 5.0 parts per 100 parts of monomer of an insoluble metallic soap having the structure $(X—COO)_nM$ wherein X represents an alkyl group having from 7 to 21 carbon atoms, M is a member selected from the group consisting of lithium, barium, calcium, magnesium, cadmium, zinc, lead, tin and aluminum and $n$ is a whole number equal to the valence of M.

11. The method according to claim 10 wherein the free-radical catalyst concentration is from 0.05 to 3 parts by weight per 100 parts by weight of monomer, the insoluble metallic soap concentration is from 0.1 to 2.0 parts by weight per 100 parts by weight of monomer, and the temperature of polymerization is within the range of about 30° C. to about 60° C.

12. The method according to claim 11 wherein the acrylic ester is ethyl methacrylate.

13. The method according to claim 11 wherein the acrylic ester is n-butyl acrylate, and the insoluble soap is lithium stearate.

14. The method which comprises polymerizing a monomeric mixture of methyl methacrylate and ethyl acrylate at a temperature below 100° C., with low shear stirring to form polymer composed of a family of spherical uniform size particles having a diameter within the range of 0.1 to 10 microns, in a sufficient amount of water to provide emulsifying condition for said monomer and resulting polymer, the amount of water being at least about 75% by weight of the total water and monomers combined, in the presence of a free radical catalyst, and from 0.1 to 5 parts per 100 parts of monomer of calcium laurate.

15. The method which comprises polymerizing a monomeric mixture of 49% by weight of methyl methacrylate, 49% of ethyl acrylate and 2% by weight of acrylic acid at a temperature below 100° C., with low shear stirring to form polymer composed of a family of spherical uniform size particles having a diameter within the range of 0.1 to 10 microns, in a sufficient amount of water to provide emulsifying condition for said monomer and resulting polymer, the amount of water being at least about 75% by weight of the total water and monomers combined, in the presence of a free radical catalyst, and from 0.1 to 5 parts per 100 parts of monomer of magnesium laurate.

References Cited
UNITED STATES PATENTS

| | | | |
|---|---|---|---|
| 2,140,048 | 12/1938 | Fikentscher et al. | 260—23 |
| 2,388,373 | 11/1945 | Stewart | 260—23 |
| 2,471,742 | 5/1949 | Harrison | 260—23 |
| 2,496,864 | 2/1950 | Fiedler et al. | 260—23 |
| 2,545,702 | 3/1951 | Norris | 260—23 |
| 2,671,760 | 3/1954 | Port et al. | 260—85.7 |
| 3,196,134 | 7/1965 | Donat et al. | 260—23 |
| 3,249,594 | 5/1966 | Donat et al. | 260—23 |

DONALD E. CZAJA, *Primary Examiner.*

LEON J. BERCOVITZ, *Examiner.*

R. A. WHITE *Assistant Examiner.*